Patented Aug. 24, 1926.

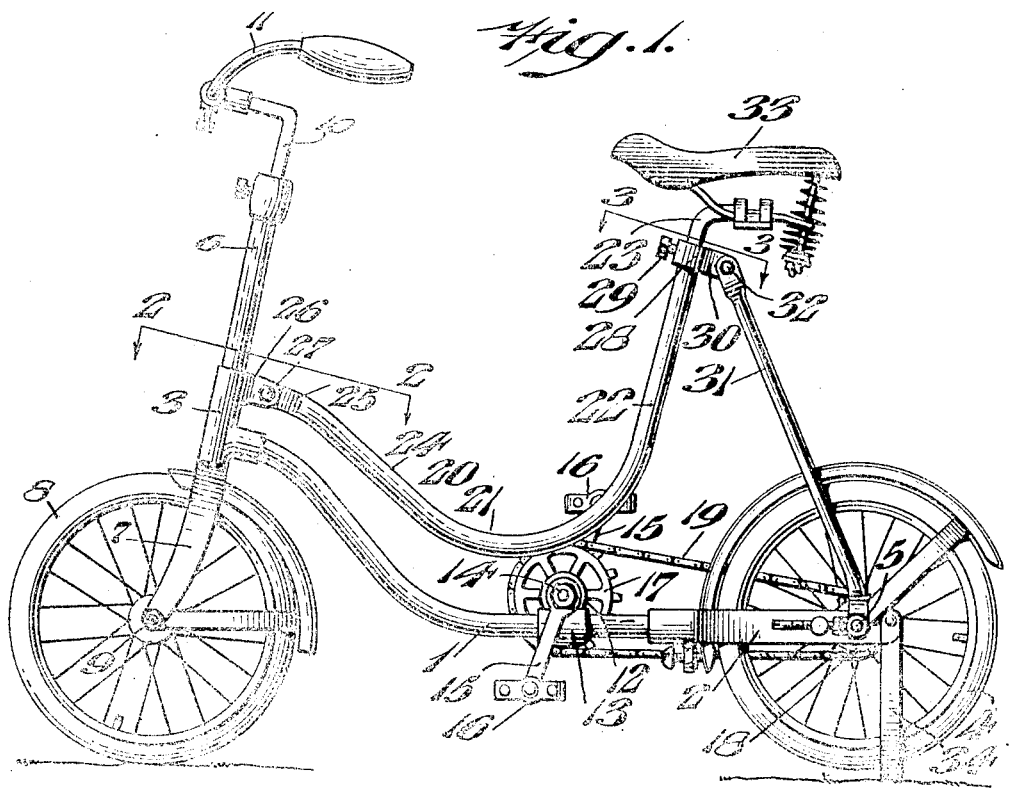
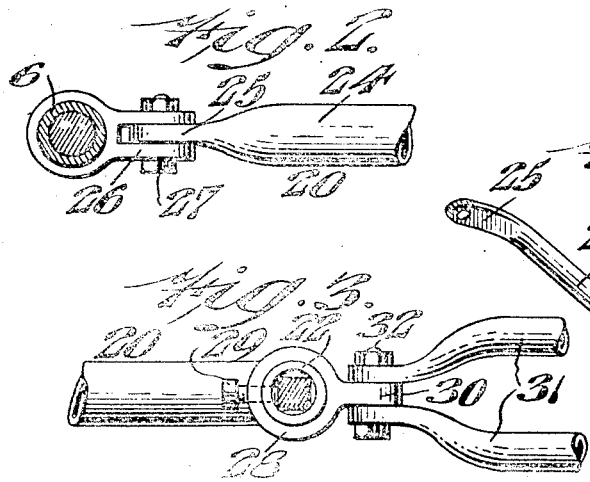
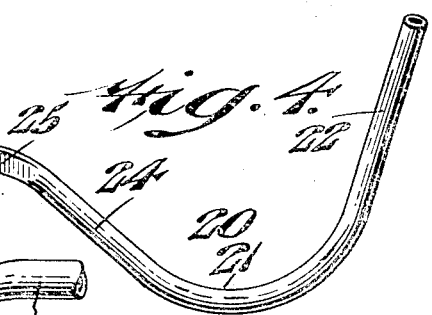

1,597,195

UNITED STATES PATENT OFFICE.

ERNEST R. HEYM, OF PHILADELPHIA, PENNSYLVANIA.

VELOCIPEDE.

Application filed February 19, 1926. Serial No. 89,311.

My invention relates to a new and useful velocipede and a novel construction therein, and it relates more particularly to a juvenile vehicle of the bicycle type.

In juvenile velocipedes of this character it has been the practice to build the frame of a single lower longitudinal frame member terminating in the rear fork and having the front steering knuckle secured to the front terminal thereof, and having an upright seat column secured thereto intermediate of its ends, and also having a rear brace extending between the rear axle carried by the rear fork and the upper part of the seat column; said prior construction employing no upper longitudinal bracing member between the seat post and the steering column but relying entirely on a single longitudinal frame member to connect the rear with the front steering column, and also for carrying the seat column.

The constructions used heretofore, possessed certain inherent weaknesses, deficiencies and disadvantages, in so far as the total weight of the rider was transmitted directly from the seat downward through the seat column, directly onto to the longitudinal frame member, intermediate of its ends, and substantially midway between the front and rear axles, and was borne entirely by said longitudinal frame member. The result has been that the longitudinal frame member would break and twist transversely, whenever it was subjected to an undue amount of strain, as when riding over a rough road.

By my novel construction these inherent weaknesses are overcome, without the aid of an upper horizontal longitudinal bracing member between the front steering column and the seat column, which would form an obstruction to the rider taking to the velocipede or alighting therefrom; my novel construction producing at the same time a more resilient frame structure, which while resilient is not subject to any twisting or any permanent distortion.

With the above ends in view, my invention consists of a novel velocipede frame, comprising a lower longitudinal frame member, extending substantially horizontally and terminating at its rear end in a fork which is adapted to carry the rear wheel, and terminating at its front end, in a steering knuckle which is adapted to receive the front steering column, a combined resilient seat column and brace member, having a substantially upright seat column portion, extending substantially parallel to the steering column, and having a lower brace member curved at the lower end thereof in a forward direction and extending forwardly substantially parallel to the lower longitudinal frame member and in proximity thereto, and having its lower front terminal secured or connected with the steering knuckle or the front end of said lower longitudinal brace member, and a rear brace extending between the rear axle and the upper terminal of said combined resilient seat column and brace member.

For the purpose of illustrating my invention, I have shown in the accompanying drawings forms thereof which are at present preferred by me since they will give in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings,

Figure 1 represents a side elevation of a velocipede of the novel construction embodying my invention.

Figure 2 represents a section on line 2—2 of Figure 1.

Figure 3 represents a section on line 3—3 of Figure 1.

Figure 4 represents a perspective view of the novel combined resilient seat column and brace member.

Referring to the drawings, in which like reference characters indicate like parts, 1 designates the lower longitudinal frame member of the velocipede, preferably made of a suitable sized pipe, having secured to the rear end thereof or formed integral therewith, the rear fork 2 and having secured to the front end thereof or formed integral therewith, the steering knuckle 3, which may be formed of a T pipe coupling. In the rear fork 2 is rotatably mounted the rear wheel 4 in any suitable manner, upon an axle 5. A steering column 6 is pivotally mounted in the steering knuckle 3, and carries the front fork 7, in which is rotatably mounted the front wheel 8, in any suitable manner, about the front axle 9. The steering column 6 carries a handle post 10, which in turn carries the handle bar 11, of any suitable construction.

At a suitable point on the lower longitudinal frame member 1, and intermediate of its ends, is mounted the crank shaft bearing 12, carried by a sleeve support 13, which encircles the frame member 1 and is rigidly secured thereto. In the crank shaft bearing 12 is rotatably mounted the crank shaft 14, carrying the crank arms 15, which in turn carry the pedals 16, also carrying the driving sprocket wheel 17. The driving sprocket wheel 17, thus mounted upon the lower longitudinal frame member 1, is connected with the rear sprocket wheel 18, of the rear wheel 4, by means of the sprocket chain 19.

In place of the usual seat post or seat column, having its lower end secured, or rigidly connected with the lower longitudinal frame member, at a point in proximity to the crank shaft bearing 12, my invention contemplates a novel combined resilient seat column and brace member 20, of general V shape, rounded at the bottom, as at 21, and having the substantially upright straight seat column portion 22, which carries at its upper end the seat post 23, and having a forwardly extending lower portion 24, of substantially straight contour, and preferably extending parallel to the corresponding portion of the lower longitudinal frame member 1, as shown particularly in Figure 1.

The combined seat column and brace member 20 of my novel construction, is also preferably formed of a suitable sized pipe, and is provided with the flattened front terminal 25, which is pivotally connected to the bifurcated lug or projection 26 of the front steering knuckle 3, by means of the bolt 27, as shown particularly in Figures 1 and 2. The upper terminal of the novel combined seat column and brace member 20 is embraced by a collar 28, which is provided with a set screw 29 and a rearwardly extending apertured lug 30. To the lug 30 are secured a pair of rear straight brace members 31, by means of the bolt 32; the lower terminals of which brace members are carried by and secured to, the corresponding ends of the rear axle 5, as shown in Figure 1.

The seat post 23 telescopes into the upper end of the combined seat column and brace member 20, and carries any suitable saddle 33. The set screw 29 serves to secure the seat post 23 within the seat column 22. A U shaped stand 34, may be pivotally mounted upon the ends of the rear fork 2 for the purpose of providing a support for the velocipede when not in use.

It will also be readily seen, that whereas in the velocipede frame constructions employed heretofore, the saddle was carried by the upper apex of a triangle formed of the seat column and the rear brace and having for its base the rear portion of the lower longitudinal frame member between the crank-shaft bearing 12 and the rear axle 5, subtending the seat column and rear brace; in my novel construction the triangle construction is extended the entire length of the frame. Thus, in my novel construction, the saddle 33 is carried by the upper apex of a triangular frame having for its base the entire lower longitudinal frame member 1, including the rear fork 2, and having for its sides the rear brace 31 and the novel combined resilient seat column and brace member 20.

Thus by my novel construction, the longitudinal frame member 1, is not only relieved of direct transverse strain due to the weight of the rider commonly transmitted through the seat column, but in addition the longitudinal frame member 1 is also braced against twisting, or torsional strain, by the lower brace portion 24 of my novel combined seat column and brace member 20.

Moreover, by the novel V shape of the combined seat column and brace member forming one side of the triangle, a very desirable resiliency is imparted to the otherwise rigid triangular construction with twofold advantage of giving the frame an inherent cushioning or shock absorbing character, and also of minimizing the extreme strains upon the lower longitudinal frame member.

A further desirable feature of my novel velocipede construction is a frame assembly which is easily demountable for shipping. Thus, by removing the bolts 27 and 32, the combined seat column and brace member 20 is detached entirely, and the braces 31 may be folded down; while the front steering column 6 is removed from the steering knuckle in the usual manner. By placing the steering column 6 and the seat column and brace member 20, alongside the longitudinal frame member 1, the entire velocipede may be packed in a space no wider than the diameter of the wheels 4 and 8.

It will now be apparent that I have devised a novel and useful construction of velocipede which embodies the features of advantage enumerated as desirable in the statement of the invention and the above description, and while I have, in the present instance shown and described embodiments thereof which are at present preferred by me since they will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent is:—

1. In a device of the character stated, a frame comprising a lower longitudinal frame member terminating in a rear fork at one end and a front steering knuckle at the other end, a combined seat column and brace member, a rear brace connecting the upper portion of said seat column with the longitudinal frame member; the lower end of said seat column and brace member being connected to the front end of said longitudinal frame member; said combined seat column and brace member being entirely free intermediate of its ends.

2. In a device of the character stated, a frame comprising a lower longitudinal frame member terminating in a rear fork at one end and a front steering knuckle at the other end, a resilient, V shaped combined seat column and brace member, a rear brace connecting the upper portion of said column, with the longitudinal frame member; the lower end of said seat column and brace member being connected to the front end of said longitudinal frame member; said combined seat column and brace member being unitary and continuous, and being entirely free intermediate of its ends.

3. In a device of the character stated, a frame comprising a lower longitudinal frame member terminating in a rear fork at one end and a front steering knuckle at the other end, a combined seat column and brace member, a rear brace connecting the upper portion of said seat column with the longitudinal frame member, the lower end of said seat column and brace member being connected to the front end of said longitudinal frame member; the seat column portion of said combined seat column and brace member being disposed substantially upright while the bracing portion thereof being curved forwardly and extending substantially laterally to the front end of said longitudinal frame member; and said combined seat column and brace member being entirely free intermediate of its ends.

4. In a device of the characted stated, a frame comprising a lower longitudinal frame member terminating in a rear fork at one end and a front steering knuckle at the other end, a combined resilient seat column and brace member, a rear brace connecting the upper portion of said resilient seat column with the longitudinal frame member; the lower end of said seat column and brace member being connected to the front end of said longitudinal frame member; and said combined seat column and brace member being entirely free intermediate of its ends.

5. In a device of the character stated, a lower longitudinal frame member, terminating at its rear end in a fork and terminating at its fore end in a steering knuckle, a combined resilient and continuous seat column and brace member, having a substantially upright seat column portion and a curved and forwardly extending brace portion, extending forwardly to the fore end of the longitudinal frame member and secured thereto, a brace extending between the upper portion of said seat column and said rear fork and being secured thereto, said combined seat column and brace member being entirely free intermediate of its ends, a rear wheel rotatably mounted in said rear fork, a crank shaft rotatably mounted on said longitudinal frame member in advance of said rear wheel, pedals carried by said crank shaft, power transmission means intermediate said crank shaft and said rear wheel, a front steering column pivotally mounted in said front steering knuckle, a front wheel rotatably carried by the lower end of said front steering column and a saddle carried by the upper end of said seat column.

6. In a device of the character stated, a frame comprising a lower longitudinal frame member terminating in a rear fork and a front steering knuckle at its two ends respectively, a combined unitary resilient seat column and brace member having a substantially upright seat column portion and a curved forwardly extending brace portion continuous therewith, having its front end pivotally secured to said steering knuckle, and a rear brace extending between the upper end of said seat column and said fork and pivotally secured to the same at its two ends respectively; said combined seat column and brace member being entirely free intermediate of its ends.

7. In a device of the character stated, a frame comprising a lower longitudinal frame member terminating in a rear fork and a front steering knuckle at its two ends respectively, a combined unitary resilient seat column and brace member having a substantially upright seat column portion and a curved forwardly extending brace portion continuous therewith, having its front end detachably secured to said steering knuckle, and a rear brace extending between the upper end of said seat column and said fork and detachably secured to the same at its two ends respectively; said combined seat column and brace member being entirely free intermediate of its ends.

ERNEST R. HEYM.